United States Patent
Jungert et al.

(10) Patent No.: US 9,205,768 B2
(45) Date of Patent: Dec. 8, 2015

(54) SEAT IN A MEANS OF TRANSPORTATION

(75) Inventors: Dieter Jungert, Weissach (DE); Tassilo Gilbert, Pforzheim (DE); Joachim Mueller, Rutesheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 180 days.

(21) Appl. No.: 13/021,180

(22) Filed: Feb. 4, 2011

(65) Prior Publication Data

US 2011/0204695 A1    Aug. 25, 2011

(30) Foreign Application Priority Data

Feb. 25, 2010 (DE) .......... 10 2010 009 356

(51) Int. Cl.
- A47C 7/02 (2006.01)
- B60N 2/42 (2006.01)
- B60N 2/68 (2006.01)

(52) U.S. Cl.
CPC ............ B60N 2/4228 (2013.01); B60N 2/4249 (2013.01); B60N 2/68 (2013.01)

(58) Field of Classification Search
USPC ............. 297/452.29, 452.36, 216.13, 452.31, 297/452.33, 452.3, 452.2, 452.18, 440.2, 297/440.21, 284.4
See application file for complete search history.

(56) References Cited

U.S. PATENT DOCUMENTS

| | | | | |
|---|---|---|---|---|
| 645,878 | A * | 3/1900 | Tennyson | 297/252 |
| 1,684,062 | A * | 9/1928 | Eberle et al. | 297/452.29 |
| 3,114,578 | A * | 12/1963 | Hamilton | 297/452.63 |
| 3,259,435 | A * | 7/1966 | Jordan, Jr. | 297/452.53 |
| 4,109,959 | A * | 8/1978 | Barecki et al. | 297/216.14 |
| 4,519,650 | A * | 5/1985 | Terada et al. | 297/452.18 |
| 4,746,168 | A * | 5/1988 | Bracesco | 297/440.2 |
| 4,768,833 | A * | 9/1988 | Virtue | 297/440.2 |
| 4,969,688 | A * | 11/1990 | Chinomi et al. | 297/452.29 |
| 5,054,845 | A * | 10/1991 | Vogel | 297/216.14 |
| 5,129,707 | A * | 7/1992 | Yamauchi | 297/216.14 |
| 5,253,924 | A * | 10/1993 | Glance | 297/452.1 |
| 5,468,053 | A * | 11/1995 | Thompson et al. | 297/472 |
| 5,509,716 | A * | 4/1996 | Kolena et al. | 297/216.13 |
| 5,547,259 | A * | 8/1996 | Fredrick | 297/452.18 |
| 5,575,533 | A * | 11/1996 | Glance | 297/452.2 |

(Continued)

FOREIGN PATENT DOCUMENTS

| | | |
|---|---|---|
| DE | 8620922 | 9/1986 |
| DE | 695 15 604 | 10/2000 |

(Continued)

*Primary Examiner* — David R Dunn
*Assistant Examiner* — Alexander Harrison
(74) *Attorney, Agent, or Firm* — Gerald E. Hespos; Michael J. Porco; Matthew T. Hespos

(57) ABSTRACT

A seat for a transportation vehicle has a rigid seat cushion structure and a rigid seat back structure. The seat back structure has two rigid side parts and upper and lower crosspieces connecting the side parts. The upper crosspiece connects the two side parts to each other in the region of their upper ends, and the lower crosspiece connects the two side parts at a distance from the lower ends. The lower crosspiece is above that region of the rear part that supports the posterior of the occupant. The arrangement of the lower rigid crosspiece holds the posterior of the occupant between the lower crosspiece and the seat cushion structure. Thus, the occupant's back and head are not moved up, in particular are not moved beyond the region of the head restraint of the rear part.

4 Claims, 1 Drawing Sheet

(56) References Cited

U.S. PATENT DOCUMENTS

| | | | |
|---|---|---|---|
| 5,722,731 A * | 3/1998 | Chang | 297/473 |
| 5,795,024 A * | 8/1998 | Collins et al. | 297/361.1 |
| 5,971,490 A * | 10/1999 | Chang | 297/473 |
| 6,010,195 A * | 1/2000 | Masters et al. | 297/452.55 |
| 6,036,273 A * | 3/2000 | Lin | 297/452.63 |
| 6,199,252 B1 * | 3/2001 | Masters et al. | 29/91.1 |
| 6,378,946 B1 * | 4/2002 | Cope et al. | 297/452.2 |
| 6,423,388 B1 * | 7/2002 | Bateson et al. | 428/36.3 |
| 6,481,800 B2 * | 11/2002 | Duncan | 297/452.2 |
| 6,666,520 B2 * | 12/2003 | Murphy et al. | 297/483 |
| 6,926,358 B2 * | 8/2005 | Fujita et al. | 297/216.14 |
| 7,114,782 B2 * | 10/2006 | Ambasz | 297/452.2 |
| 7,147,288 B2 * | 12/2006 | Grasse et al. | 297/452.2 |
| 7,513,574 B2 * | 4/2009 | Nagayama et al. | 297/452.18 |
| 7,716,797 B2 * | 5/2010 | Kismarton et al. | 29/91.1 |
| 7,959,233 B2 * | 6/2011 | Sweers et al. | 297/452.18 |
| 8,016,258 B1 * | 9/2011 | Boyarski et al. | 248/576 |
| 8,419,127 B1 * | 4/2013 | Wilhelm et al. | 297/216.13 |
| 2007/0222190 A1 * | 9/2007 | Tracht | 280/730.2 |
| 2008/0038569 A1 * | 2/2008 | Evans et al. | 428/474.9 |
| 2009/0127906 A1 * | 5/2009 | Sugiyama | 297/284.4 |
| 2010/0007122 A1 * | 1/2010 | Clauser et al. | 280/730.2 |
| 2012/0193954 A1 * | 8/2012 | Sakkinen et al. | 297/216.13 |

FOREIGN PATENT DOCUMENTS

| | | |
|---|---|---|
| JP | 2006-324647 | 11/2006 |
| JP | 2007-294891 | 11/2007 |
| JP | 2009-135477 | 6/2009 |

\* cited by examiner

SEAT IN A MEANS OF TRANSPORTATION

CROSS REFERENCE TO RELATED APPLICATION

This application claims priority under 35 USC 119 to German Patent Application No. 10 2010 009 356.4, filed on Feb. 25, 2010, the entire disclosure of which is incorporated herein by reference.

BACKGROUND OF THE INVENTION

1. Field of the Invention

The invention relates to a seat in a means of transportation, such as in a motor vehicle.

2. Description of the Related Art

A seat for a means of transportation comprises a lower part for supporting the posterior and thighs of an occupant and a rear part for supporting the posterior, back and head of the occupant. Each of the lower and rear parts has a rigid seat cushion structure covered by padding. The lower end of the seat back structure is mounted in the seat cushion structure. The seat back structure has two side parts and upper and lower crosspieces. The upper crosspiece is rigid and connects upper ends of the two side parts to each other. The lower crosspiece connects the two side parts at a position below the lower crosspiece.

DE 695 15 604 T2 discloses a seat of type described above. The lower crosspiece of the seat disclosed in DE 695 15 604 T2 is arranged at a small distance from the lower ends of the side parts of the seat back structure and therefore at a small distance from the connecting region of the seat back structure and seat cushion structure. The lower cross part typically is made of metal, but may be plastically deformed by the occupant in the event of a rear-end crash of the means of transportation. The cross part, however, is sufficiently strong to avoid breaking.

This configuration of the seat in the region of the lower cross part of the seat back structure should be considered in view of the possibility of a rear-end crash of the means of transportation. More particularly, the occupant in the seat is moved rearward toward the seat back structure in the event of a rear-end crash due to inertia forces that occur. The posterior of the occupant is supported on the lower crosspiece, and the forces that are introduced into the crosspiece via the occupant in the event of a rear end crash are of such a magnitude that the crosspiece is deformed plastically. The positioning of the lower cross part in the vicinity of the lower end of the seat back structure is not suitable for ensuring a positioning of the vehicle occupant in the seat in the event of a rear-end crash.

There is a great risk of the occupant being subject to a whiplash injury in the event of a rear-end crash. The impact on the means of transportation in the event of a rear-end crash leads to the movement being transmitted to the occupant. This takes place after a short delay time when the means of transportation is a motor vehicle. More particularly, the crumple zone of the vehicle is deformed first and the vehicle itself that has been hit then is set into motion in a manner corresponding to the momentum of the impact. The acceleration is transmitted via the seat to the occupant. The occupant is moved rearward in the seat as a result of the inertia forces. The crosspiece of the seat back structure that is arranged quite far down has the effect here that the occupant who is moving rearward is subjected to a moment that rotates the upper body of the occupant rearward and up about the lower crosspiece. This inertia of the occupant causes the upper body, following contact with the lower crosspiece, to move up in addition to the rearwardly directed movement. This upward movement should be prevented to minimize the whiplash effect. In particular, the upper body of the occupant should not move up in the event of a rear-end crash to an extent that the occupant's head is moved beyond the region of the head restraint and then can move rearward.

An object of the invention is to develop seat for a means of transportation that reduces risk of injury to an occupant due to whiplash in the event of a rear-end crash.

SUMMARY OF THE INVENTION

The object is achieved by a seat with a rigid lower crosspiece arranged above the region of the rear part that supports the posterior of the occupant.

The position of the vehicle occupant's posterior is below the lower crosspiece. The occupant is moved rearward in the seat due to the inertia forces in the event of a rear-end crash. Accordingly, that portion of the occupant's inertia that is effective below the crosspiece can reduce an upward movement of the occupant. The moment acting on the occupant in the region of the posterior therefore is opposed to a moment that would act on the occupant if the crosspiece were arranged farther down, level with the posterior or at the lower end of the seat back structure. The occupant's posterior therefore is wedged between the lower crosspiece of the seat back structure and the seat cushion structure in the event of a rear-end crash due to the configuration of the seat. The lower crosspiece is not deliberately deformed under the action of the force of the occupant in the event of a rear-end cash, but rather is substantially rigid.

The arrangement of the lower crosspiece in the seat fixes the posterior region of the occupant in the event of a rear-end crash. Thus, the upper body of the occupant cannot move up in a rear-end crash. Accordingly, in the event of a rear-end crash, the head of the occupant will be retained substantially in the direct vicinity of the head restraint, and the occupant's head will not move up and rearward beyond the region of the head restraint. The seat configuration of the invention increases the safety in the event of a rear-end crash of the vehicle at high speed by the occupant being "held", as it were, in the seat. This effect is applicable even at slow speeds. The seat of the invention results in high occupant safety because, while the occupant is shifted rearward in the event of a rear-end crash, the movement upward is reduced. Furthermore, the occupant is subjected to a moment that opposes the whiplash movement. The seat configuration of the invention increases the safety in the event of a rear-end crash of the vehicle at high speed. This effect is likewise applicable even at slow speeds. This also is of significance for insurance assessments and consumer protection laws in terms of anti-whiplash requirements.

The seat back structure is configured substantially in the shape of an A. The configuration of the seat back structure therefore differs from those customary seats in a means of transportation, in which the two side parts and the two crosspieces connecting said the parts are arranged substantially rectangularly.

The lower crosspiece preferably is connected to the side part within a range of 20 to 40% of the length of the respective side part, in particular within a range of ⅓ of the length of the respective side part, as calculated from the lower end thereof. This dimensioning of the seat back structure in terms of the arrangement of the lower crosspiece ensures that the lower crosspiece is above that region of the rear part of the seat that serves to support the posterior of the occupant.

The side parts and the crosspieces are substantially in one plane. In the event of a rear-end crash, the occupant therefore acts on a flat structure and subjects the occupant to substantially constant counterforces over the height of the seat back structure. This reinforces the holding effect of the occupant in the seat.

The seat back structure and the seat cushion structure preferably are produced in a primary forming process. A scheme of ribs typical of casting can be set for the impact of the occupant and enables a resistance that is particularly advantageous for occupant kinematics. The seat cushion structure and the seat back structure can be connected fixedly or adjustably to each other.

The seat of the invention can be used in any suitable means of transportation in which there is the risk of the means of transportation being subjected to forces corresponding to a rear-end crash in a motor vehicle, and therefore to forces acting from the rear on a frame accommodating the seat. However, the seat of the invention preferably is used in a motor vehicle, such as a passenger vehicle.

The invention is described below in a schematic illustration for a basic embodiment without being restricted thereto.

DETAILED DESCRIPTION OF THE PREFERRED EMBODIMENT

Figure 1:
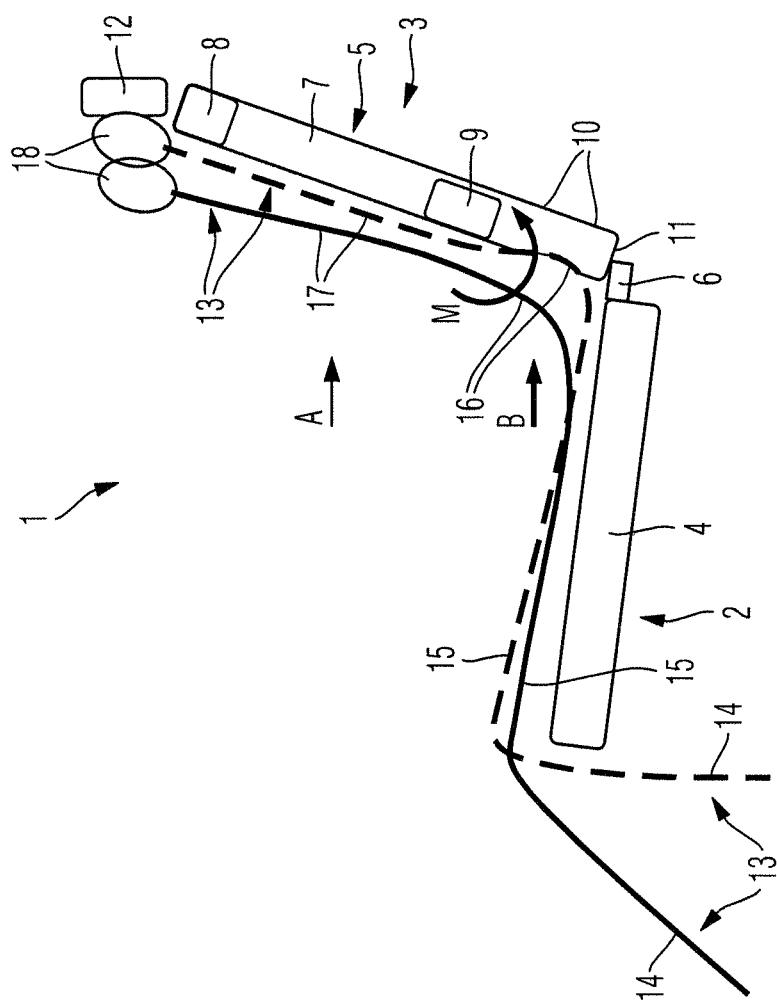
FIG. 1 is a side view of the seat, illustrated in partially sectioned form, with the position of an occupant being shown firstly in the normal state and secondly in the event of a rear-end crash.

FIG. 1 shows a seat 1 of a passenger vehicle, in particular a driver's seat. The seat has a lower part 2 for receiving the posterior and thighs of an occupant, and a rear part 3 for supporting the posterior, back and head of the occupant. The lower part 2 has a rigid seat cushion structure 4, padding (not shown) resting on the rigid seat cushion structure 4 and, if appropriate, a cover for the padding. The rear part 3 has a rigid seat back structure 5, padding (not illustrated) and, if appropriate, a cover for the padding. A lower end region of the seat back structure 5 is mounted in the rear end region of the seat cushion structure 4 by a mounting means that is denoted generally by the reference number 6. The mounting 6 is configured in such a manner that the seat cushion structure 4 and the seat back structure 5 are connected fixedly or adjustably, in particular pivotably, to each other.

The seat back structure 5 has two side parts 7 that converge slightly toward one another as they extend up. Rigid horizontal upper and lower crosspieces 8 and 9 connect the side parts 7. The upper crosspiece 8 connects upper end regions of the two side parts 7 to each other. The lower crosspiece 9 connects the two side parts 7 at a distance from the lower ends. Specifically, the lower crosspiece 9 is spaced from the lower ends of the side part 7 to be above a region 10 of the rear part 3 of the seat back structure 5 that supports the posterior of the occupant. The seat back structure 5 is therefore substantially in the shape of an A.

The seat cushion structure 4 and the seat back structure 5 of the seat 1 each preferably is produced in a primary forming process, for example in a die casting process, and each preferably consists substantially of magnesium. The side part 7 and the crosspieces 8, 9 of the seat back structure 5 are arranged substantially in one plane. The lower crosspiece 9 is connected to the side part within a range of 20 to 40% of the length of the respective side part 7, and preferably about ⅓ of the length of the respective side part 7, as calculated from the lower end 11 thereof.

The rear part 3 of the seat 1 also includes a head restraint 12 that is mounted in the in the region of the upper end of seat back structure 3 for the occupant of the passenger vehicle.

Figure 2:
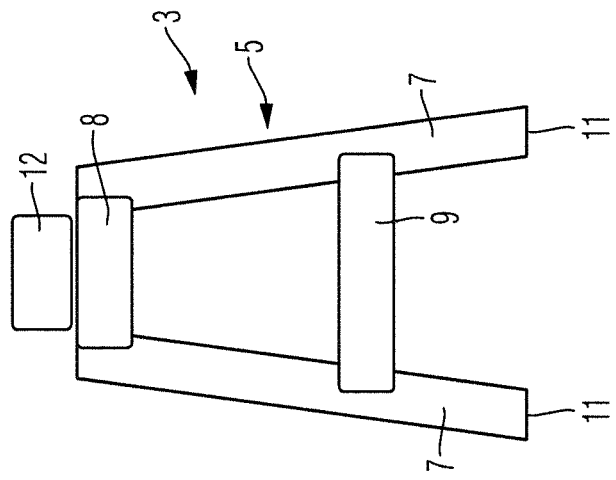
FIG. 2 shows a view of the seat back structure of the seat shown in FIG. 1, as seen in the direction of the arrow A in FIG. 1.

FIG. 2 shows the arrangement of the two side parts 7, of the crosspieces 8 and 9, and of the head restraint 12.

FIG. 1 also illustrates an occupant 13 sitting on the seat 1. The solid line depicts the occupant 13 during normal conditions and the dashed line depicts the occupant 13 in the event of a rear-end crash. Thus, the dashed line illustrates the movement of the occupant 13 in the event of a rear-end crash.

The occupant 13 has lower legs 14, thighs 15, a posterior 16, a back 17 and a head 18 illustrated shown in FIG. 1. The lower part 2, and specifically the seat cushion structure 4, supports the posterior 16 and thighs 15 of the occupant 13. The rear part 3 supports the posterior 16, back 17 and head 18 of the occupant 13. More particularly, the posterior 16 and back 17 are supported on the seat back structure 5 and the head 18 is supported on the head restraint 12.

This support arrangement applies to the normal state when no rear-end crash conditions are present, and to the particular case of a rear-end crash.

In the event of a rear-end crash, the occupant 13 is moved rearward in the seat 1 due to the inertia forces in effect, as illustrated by the arrow B. The seat back structure 5 behind the cover and the foam of the padding subjects the occupant 13 to a load. Thus, the posterior 16, which is arranged below the height level of the lower crosspiece 9, is moved slightly under the lower crosspiece 9. Therefore, the posterior 16 is held between the lower crosspiece 9 and the lower part 2, in particular the seat cushion structure 4. The fixing of the posterior 16 of the occupant 13 ensures that the back 17 and head 18 of the occupant 13 are not moved up and, in particular, the head 18 of the occupant 13 is not moved up beyond the region of the head restraint 12. In the event of a rear-end crash, the head 18 therefore remains in the region of the head restraint 12, and therefore the seat back of the seat 1 of the invention has the function of an anti-whiplash seat back.

The rigid lower crosspiece 9 is not deformed and can therefore perform the function of embracing the posterior 16 and holding the occupant 13 in the seat 1. This arrangement of the lower crosspiece 9 causes a moment to act on the occupant 13, illustrated by the moment arrow M. The moment counteracts a force on the occupant 13 that would pull the occupant 13 up. Therefore the movement of the occupant 13 upward is reduced. The moment M to which the occupant 13 is subjected therefore opposes the whiplash movement.

What is claimed is:

1. A seat in a means of transportation, comprising a lower part for supporting a posterior and thighs of an occupant, and a rear part for supporting the posterior, back and head of the occupant, the lower part having a rigid seat cushion structure and padding, the rear part having a rigid seat back structure and padding, the seat back structure being die cast to define a unitary member, a lower end region of the seat back structure being mounted in the seat cushion structure, the rigid seat back structure having first and second side parts having front surfaces disposed in a common plane, each of the side parts having opposite upper and lower end regions, the lower end regions of the side parts being connected to the rigid seat cushion structure of the lower part, the side parts converging toward one another from the lower end regions toward the upper end regions, rigid upper and lower crosspieces connecting the side parts, the upper crosspiece connecting the upper end regions of the two side parts to each other, and the lower crosspiece connecting the two side parts at a distance from the lower ends thereof at positions approximately within a range of ¼ to ⅓ of a length of the respective side part, as calculated from the lower end thereof, a head restraint mounted above the upper crosspiece for supporting the head of the occupant, the upper and lower crosspieces having front surfaces extending continuously from the first side part to the second side part and all of the front surfaces of the upper and lower cross pieces between the first and second side parts being arranged in the common plane with front surfaces of the first and second side parts, the lower crosspiece being arranged sufficiently above a region of the rear part that supports the posterior of the occupant to define a space of substantially trapezoidal shape that permits the posterior of the occupant to be wedged between the converging side parts, the lower cross piece and the rigid seat cushion structure of the lower part in the event of a rear end collision so that a position of the head of the occupant does not move up beyond the head restraint for substantially preventing whiplash injuries in the event of the rear end collision.

2. The seat of claim 1, wherein the seat back structure is substantially in the shape of an A.

3. The seat of claim 1, wherein the seat back structure is made of magnesium.

4. The seat of claim 1, where the seat cushion structure and the seat back structure are connected fixedly or adjustably to each other.

\* \* \* \* \*